United States Patent
Yamamoto et al.

[11] Patent Number: 5,684,522
[45] Date of Patent: Nov. 4, 1997

[54] METHOD OF RECORDING INFORMATION ON FERROELECTRIC MATERIAL USING POLARIZATION

[75] Inventors: Ryoichi Yamamoto; Shizuo Umemura; Kazuo Sanada, all of Kanagawa-ken, Japan

[73] Assignee: Fuji Photo Film Co., Ltd., Kanagawa, Japan

[21] Appl. No.: 204,510

[22] Filed: Mar. 2, 1994

[30] Foreign Application Priority Data

Mar. 2, 1993 [JP] Japan ............... 5-041019

[51] Int. Cl.$^6$ ............... B41J 2/47; G01D 15/14; G02B 26/00; G02B 27/00
[52] U.S. Cl. ............... 347/142; 347/151
[58] Field of Search ............... 347/112, 120, 347/141, 142, 143, 144, 151, 153; 503/200

[56] References Cited

FOREIGN PATENT DOCUMENTS 47-37403  12/1972  Japan .
57-27447  2/1982   Japan .

Primary Examiner—Benjamin R. Fuller
Assistant Examiner—Raquel Yvette Gordon
Attorney, Agent, or Firm—Sughrue, Mion, Zinn, Macpeak & Seas, PLLC

[57] ABSTRACT

An information recording medium has a semiconductor layer and a ferroelectric layer formed thereon. Information is recorded on the recording medium by locally applying an electric voltage modulated according to the information to the recording medium and then removing it therefrom so that the ferroelectric layer is polarized by an electric charge produced by application of the electric voltage. The electric charge is caused to stay on the surface of the ferroelectric layer for at least 0.1 msec after removal of the electric voltage.

2 Claims, 1 Drawing Sheet

METHOD OF RECORDING INFORMATION ON FERROELECTRIC MATERIAL USING POLARIZATION

BACKGROUND OF THE INVENTION

1. Field of the Invention

This invention relates to a method of recording information and an information recording medium which can be used in carrying out the method, and more particularly to a method of recording information on an information recording medium comprising a semiconductor layer and a ferroelectric layer formed thereon, by the use of polarization in the ferroelectric layer.

2. Description of the Prior Art

As an information recording medium for recording an image signal, a sound signal or the like or for use as a data memory for computers, there have been known mediums in which information is recorded in the form of unevenness, such as pits, and is reproduced by detecting the change in the electrostatic capacitance caused by the uneveness. See, for instance, Japanese Unexamined Patent Publication No. 47(1972)-37403.

Further as an information recording medium on which information can be recorded in a very high density while permitting reproduction and erasure of the information, there have been known those which comprises a semiconductor layer and a ferroelectric layer formed thereon and on which information is recorded in the form of directions of polarization in the ferroelectric layer. See, for instance, Japanese Unexamined Patent Publication No. 57(1982)-27447. Further, a method of and an apparatus for recording information on such information recording medium have been known. In the method or the apparatus, information is recorded by applying electric voltages modulated according the information to the ferroelectric layer while moving a conductive head along the ferroelectric layer and selectively polarizing only predetermined parts of the ferroelectric layer in predetermined directions. Further there has been proposed a method of reproducing the information recorded thereon by detecting the change in the electrostatic capacitance caused by depletion layer formed by the polarization of the ferroelectric layer.

In the method described above where polarization of the ferroelectric layer is used for recording, an electric field which is formed in the ferroelectric layer by applying a predetermined electric voltage between the conductive head and the semiconductor layer or by electrifying the surface of the ferroelectric layer by charged particles from the conductive head polarizes the ferroelectric layer in the normal direction of the ferroelectric layer thereof, and a depletion layer is formed in the semiconductor layer adjacent to the ferroelectric layer according to the direction of polarization, whereby recording is effected. The degree of polarization of the ferroelectric layer depends upon the time for which the electric field is applied to the ferroelectric layer. Accordingly when the conductive head passes a desired recording region before completion of polarization of the ferroelectric layer, the electric field established by the voltage between the conductive head and the semiconductor layer is naturally removed, and at the same time the charge on the surface of the ferroelectric layer is generally immediately dispersed, which results in incompletion of polarization and readout errors in reproduction of the information. Accordingly, the conductive head must be moved slowly so that a given recording region is completely polarized. The time required for polarization is markedly long as compared with the data transfer time required for application of electric voltages (modulated according to information data) to the information recording medium, and the polarization speed governs the information recording speed and prevents shortening of the recording time.

SUMMARY OF THE INVENTION

In view of the foregoing observations and description, the primary object of the present invention is to provide a method of recording information and an information recording medium which can shorten the recording time.

In a method of recording information where an electric voltage modulated according to the information to be recorded is locally applied to an information recording medium comprising a semiconductor layer and a ferroelectric layer and then removed therefrom so that a charge according to the electric voltage applied is produced on the region of the ferroelectric layer surface applied with the electric voltage, thereby recording the information so that the information can be reproduced by detecting the change in the electrostatic capacitance caused by a depletion layer in the semiconductor layer formed due to polarization of the ferroelectric layer caused by the electric field produced by the charge. The method in accordance with the present invention is characterized in that the charge on the ferroelectric layer surface is caused to stay there for a predetermined time after removal of the electric voltage so that polarization of the ferroelectric layer is kept progressing until completion of the polarization.

That is, in accordance with the present invention, there is provided a method of recording information in which the information is recorded on an information recording medium comprising a semiconductor layer and a ferroelectric layer formed thereon by locally applying an electric voltage modulated according to the information to be recorded to the recording medium and then removing it therefrom so that the ferroelectric layer is polarized by an electric charge produced by application of the electric voltage. The method is characterized in that said electric charge is caused to stay on the ferroelectric layer surface for at least 0.1 msec after removal of the electric voltage.

It is preferred that the electric charge be caused to stay on the ferroelectric layer surface for at least 1 msec after removal of the electric voltage in order to make the polarization more perfect.

When applying the electric voltage to the recording medium, an electric charge may be produced by bringing a needle electrode into contact with the surface of the ferroelectric layer or by corona discharge or field emission in noncontacting in suitable a gas.

When applying the electric voltage, the recording medium may be rotated in a two-dimensional plane relative to the electric voltage so that information recording is effected while successively changing the voltage-applying region. In such a case, it is necessary that the electric charge staying in each region has dispersed before the recording medium makes one rotation and the region returns to the voltage-applying position. This is for reading the recording start point as has been carried out in an optical disk recording system or a magnetic disk recording system. The rotational speed of the recording medium may be the same as that employed in the optical disk recording system or the magnetic disk recording system, i.e., 1800 rpm (one revolution in 33 msec) to 7200 rpm (one revolution in 8.3 msec). In this case, the time for which the electric charge is caused to stay should be 5 msec to 50 msec at the maximum.

The information recording medium in accordance with the present invention is used for carrying out the method described above, and the surface resistivity and the volume resistivity of the ferroelectric layer are selected so that the electric charge produced by application of the electric voltage stays on the ferroelectric layer surface for a predetermined time.

That is, the information recording medium in accordance with the present invention comprises a semiconductor layer and a ferroelectric layer formed thereon and is of a type in which information is recorded thereon by directions of local polarization of the ferroelectric layer and is characterized in that the surface resistivity and the volume resistivity of the ferroelectric layer are not lower than $1.0 \times 10^{10} \Omega$ and $1.0 \times 10^8$ $\Omega$cm, respectively.

In order to make the polarization more perfect, it is preferred that the surface resistivity and the volume resistivity of the ferroelectric layer be not lower than $1.0 \times 10^{11} \Omega$ and $1.0 \times 10^9$ $\Omega$cm, respectively.

The information recording medium may comprise an insulating material layer provided between the semiconductor layer and the ferroelectric layer. The semiconductor layer may comprise a substrate formed of semiconductor material or may be formed on a base plate which is formed of plastic material, glass or metal and is provided with guide grooves, pits representing sector information and the like. As the semiconductor, Si, Ge, compounds of III group and V group such as GaAs, compounds of II group and VI group such as ZnSe, and the like can be employed. Organic semiconductors such as polypyrrole, polythiophene and the like can also be employed. The organic semiconductors may be in the form of a single crystal, polycrystal or amorphous.

Though the ferroelectric layer may be formed of either inorganic ferroelectrics or organic ferroelectrics, the organic ferroelectrics are preferred from the viewpoint of stability of the information recorded. As the inorganic ferroelectrics, (Pb, La)(Zr, Ti)O$_3$, (Ba, Sr)TiO$_3$, Bi$_4$Ti$_3$O$_{12}$, BaMgF$_4$ and the like can be used. As the organic ferroelectrics, vinylidene fluoride (VDF) polymer, copolymers including vinylidene fluoride, nylons of order of an odd number, vinylidene cyanide and copolymers including vinylidene cyanide are preferable. Copolymers of vinylidene fluoride with ethylene trifluoride (TrFE) or ethylene tetrafluoride (TFE) are more preferable. Preferably the copolymer includes 50 to 80 mol % of vinylidene fluoride. In the nylons of order of an odd number, nylon-11 and nylon-7 are preferable.

When an electric voltage modulated according to the information to be recorded is applied to the information recording medium and then removed, an electric charge is produced on the surface of the ferroelectric layer of the recording medium according to the electric voltage applied. The electric charge normally disperses in a few nsec after removal of the electric voltage through the surface resistance and/or the bulk resistance of the ferroelectric layer. However when the surface resistivity of the ferroelectric layer is not lower than $1.0 \times 10^{10} \Omega$, preferably not lower than $1.0 \times 10^{11} \Omega$, and at the same time the volume resistivity of the ferroelectric layer is not lower than $1.0 \times 10^8$ $\Omega$cm, preferably not lower than $1.0 \times 10^9$ $\Omega$cm, the electric charge can stay on the surface of the ferroelectric layer for at least 0.1 msec after removal of the electric voltage.

Accordingly by so selecting the surface resistivity and the volume resistivity of the ferroelectric layer, polarization of the ferroelectric layer can be continued to progress even after removal of the electric voltage and the apparent recording speed can be increased, thereby the operational speed of the whole system including reproduction of the information can be increased.

DESCRIPTION OF THE PREFERRED EMBODIMENT

Figure 1:
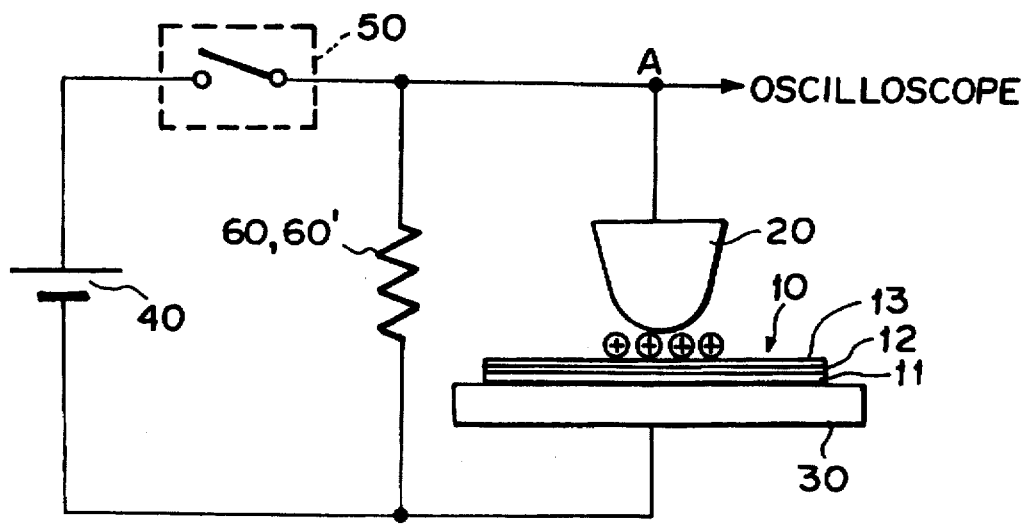
FIG. 1 is a schematic view showing an information recording and reproducing apparatus for carrying out the method of the present invention in a static system.

In FIG. 1, an information recording medium 10 comprises a semiconductor layer 11 which is a p-type silicon wafer whose resistivity is 5 $\Omega$cm and whose impurity concentration is $5.0 \times 10^{21}$ m$^{-3}$, an insulating layer 12 which is a SiO$_2$ film formed on the p-type silicon wafer in a thickness of 500 Å by thermal oxidation process, and a ferroelectric layer 13 formed on the SiO$_2$ film by applying VDF/TrFE copolymer (VDF=65 mol %). In more detail, the ferroelectric layer 13 was formed by applying 10 wt % VDF/TrFE copolymer solution in methyl ethyl ketone (MEK) to the SiO$_2$ film by use of a commercially available spin coater for 10 seconds at 5000 rpm at full power, and annealing it for 2 hours at 145° C. in an atmospheric environment by use of an oven, thereby obtaining VDF/TrFE copolymer film 1 µm thick.

The information recording medium 10 was placed on a sample table 30 and fixed there by a vacuum chuck (not shown). The sample table 30 was adapted to be driven by an electric micrometer (not shown) in a plane parallel to the surface of the recording medium 10. A movable electrode 20 was arranged so that it could be connected to a 20V power source 40 for recording through a high speed switch 50 (MOS) when recording information and to a commercially available electrostatic capacitance pickup (not shown) when reproducing the information. The sample table 30 was arranged to function as an electrode opposed to the movable electrode 20 for applying an electric voltage to the recording medium 10 when recording information. As the movable electrode 20, a tungsten needle having a semi-spherical tip (12 µm in radius) formed by electropolishing was used.

A terminal resistance 60 of 1 M$\Omega$ was first connected in parallel to the recording medium 10 and then the high speed switch 50 was closed for 0.1 µsec with the sample table 30 held stationary. The (electrostatic) potential of the recording medium 10 was monitored through an oscilloscope at point A in FIG. 1.

Thereafter the same experiment was effected replacing the terminal resistance 60 of 1 M$\Omega$ with a terminal resistance 60' of 50$\Omega$.

Figure 2:
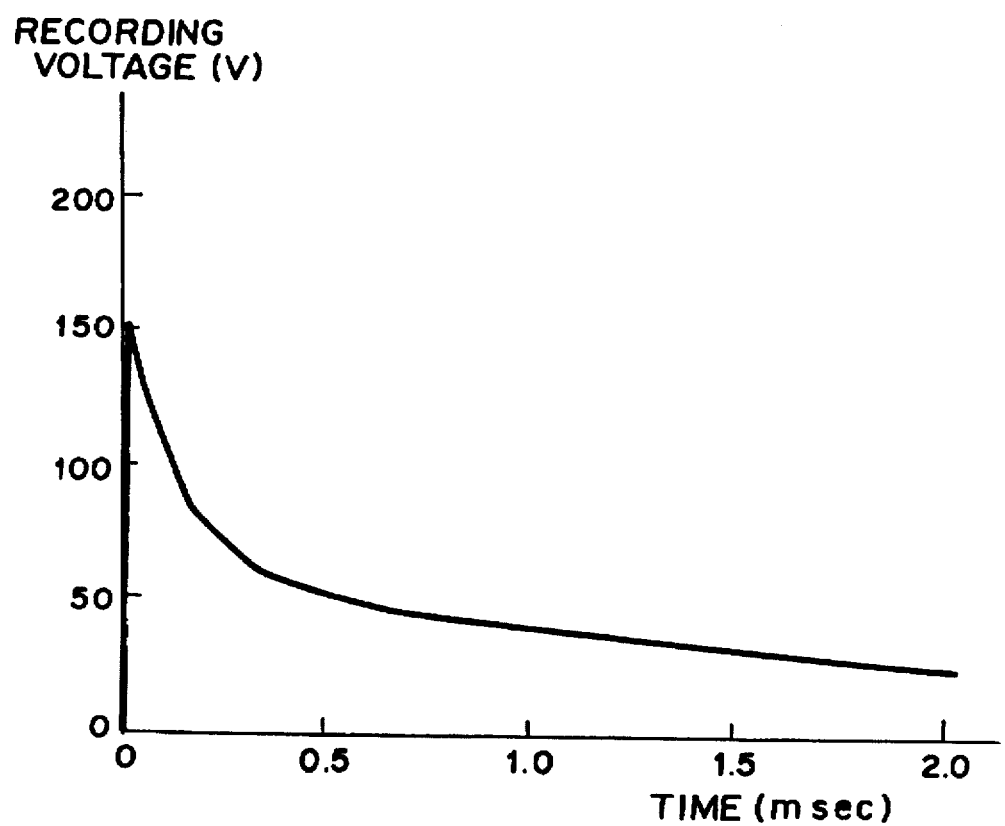
FIG. 2 is a graph showing the change in the potential at point A in an experiment where a terminal resistance of 1 M$\Omega$ is connected to the information recording and reproducing apparatus shown in FIG. 1.

FIG. 2 shows the change in potential at point A when the terminal resistance 60 of 1 M$\Omega$ was connected. As can be seen from FIG. 2, when the terminal resistance 60 of 1 M$\Omega$ was connected, the pulse generated upon application of an electric voltage gradually fell and it took 0.5 msec to fall to 1/e of the peak voltage. On the other hand, when the terminal resistance 60' of 50$\Omega$ was connected, the pulse fell to 1/e of the peak voltage in a few nsec.

The information recorded on the recording media 10 with the different terminal resistances connected (so that the electric charges stayed thereon for different times) were reproduced with the sample table 30 driven by the electric micrometer. An output signal of 100 mV was obtained from the recording medium on which the information recorded with the terminal resistance 60 of 1 MΩ connected, whereas no output signal was obtained from the recording medium on which the information recorded with the terminal resistance 60' of 50Ω connected.

The result of the above experiment shows that, even if an electric voltage is applied to the recording medium 10 for a relatively short time, polarization of the ferroelectric layer 13 can be completed by causing an electric charge to stay on the surface of the recording medium 10 after removal of the (applied) electric voltage.

Though, in the above experiment, the staying time of the electric charge was adjusted by changing the terminal resistance, in a dynamic practical system, the electric charge can be caused to stay on the surface of the ferroelectric layer for a predetermined time and the apparent recording speed can be increased when the surface resistivity and the volume resistivity of the ferroelelectric layer are not lower than $1.0 \times 10^{10} \Omega$ and $1.0 \times 10^{8}$ Ωcm, respectively.

What is claimed is:

1. A method of recording information in which the information is recorded on an information recording medium including a semiconductor layer and a ferroelectric layer, said method comprising the steps of:

applying an electric voltage modulated according to the information to be recorded to the recording medium to begin polarization of the ferroelectric layer by an electric charge;

removing said electric voltage; and maintaining said electric charge on the ferroelectric layer for a minimum time of approximately 0.1 msec after removal of the electric voltage, wherein said ferroelectric layer has a minimum surface resistivity of approximately $1 \times 10^{10} \Omega$.

2. A method of recording information in which the information is recorded on an information recording medium including a semiconductor layer and a ferroelectric layer, said method comprising the steps of:

applying an electric voltage modulated according to the information to be recorded to the recording medium to begin polarization of the ferroelectric layer by an electric charge;

removing said electric voltage; and maintaining said electric charge on the ferroelectric layer for a minimum time of approximately 0.1 msec after removal of the electric voltage, wherein said ferroelectric layer has a minimum volume resistivity of approximately $1 \times 10^{8}$ Ωcm.

* * * * *